US008654761B2

(12) United States Patent
Wu et al.

(10) Patent No.: US 8,654,761 B2
(45) **Date of Patent: *Feb. 18, 2014**

(54) SYSTEM FOR CONEALING MISSING AUDIO WAVEFORMS

(71) Applicant: Cisco Technology, Inc., San Jose, CA (US)

(72) Inventors: Duanpei Wu, San Jose, CA (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,069

(22) Filed: Dec. 17, 2012

(65) Prior Publication Data

US 2013/0226567 A1 Aug. 29, 2013

Related U.S. Application Data

(63) Continuation of application No. 11/644,062, filed on Dec. 21, 2006, now Pat. No. 8,340,078.

(51) Int. Cl.
*H04L 12/66* (2006.01)
*G10L 11/04* (2006.01)
*G10L 11/06* (2006.01)

(52) U.S. Cl.
USPC ............................ 370/352; 704/207; 704/208

(58) Field of Classification Search
USPC ..................... 370/270, 352, 412; 375/240.27; 704/221, 223, 224, 228, 267, 278, 500
See application file for complete search history.

(56) References Cited

U.S. PATENT DOCUMENTS 6,944,510 B1 * 9/2005 Ballesty et al. ................. 700/94
7,117,156 B1 10/2006 Kapilow
7,590,047 B2 9/2009 Dowdal et al.
7,930,176 B2 4/2011 Chen
2004/0184443 A1 9/2004 Lee et al.
2005/0091048 A1 4/2005 Thyssen et al.
2005/0094628 A1 5/2005 Ngamwongwattana et al.
2005/0276235 A1 12/2005 Lee et al.
2006/0171373 A1 8/2006 Li
2006/0209955 A1 9/2006 Florencio et al.
2007/0091907 A1 4/2007 Seshadri et al.
2007/0133417 A1 6/2007 LeBlanc
2007/0219790 A1 * 9/2007 Verhelst ........................ 704/220
2009/0103517 A1 4/2009 Ohmuro et al.
2011/0087489 A1 4/2011 Kapilow

OTHER PUBLICATIONS

Series G: Transmission Systems and Media, Digital Systems and Networks, Digital transmission systems—Terminal equipments—Coding of analogue signals by pulse code modulation, "Pulse Code Modulation (PCM) of voice frequencies, Appendix I: A high quality low-complexity algorithm for packet loss concealment wih G.711", Recommendation G.711/Appendix I, 25 pages, Sep. 1999, International Telecommunication Union.

Naofumi Aoki, "VOIP Packet Loss Concealment Based on Two-Side Pitch Waveform Replication Technique Using Steganography", Graduate School of Information Science and Technology, Hokkaido University, 4 pages, N14 W9, Kita-ku, Sapporo, 060-0814 Japan, 0-7803-8560-8/04/$20.00@2004IEEE.

Minkyu Lee, et al., "Prediction-Based Packet Loss Concealment for Voice Ove IP: A Statistical N-Gram Approach", Bell Labs, Lucent Technologies, 600 Mountain Avenue, Murray Hill, NJ 07974, USA {minkyul,zitouni,qzhou}@research.bell-labs.com, 5 pages, 0-7803-8794-05/04/$20.00 (C) 2004 IEEE.

* cited by examiner

*Primary Examiner* — Hassan Phillips
*Assistant Examiner* — Saba Tsegaye
(74) *Attorney, Agent, or Firm* — Fish & Richardson P.C.

(57) ABSTRACT

In one embodiment, a method can include: (i) establishing an internet protocol (IP) connection; (ii) forming a buffered version of a plurality of voice frame slices from received audio packets; and (iii) when an erasure is detected, performing a packet loss concealment (PLC) to provide a synthesized speech signal for the erasure, where the PLC can include: (a) identifying first and second pitches from the buffered version of the plurality of voice frame slices; and (b) forming the synthesized speech signal by using the first and second pitches, and more if needed, followed by an overlay-add (OLA).

21 Claims, 4 Drawing Sheets

SYSTEM FOR CONEALING MISSING AUDIO WAVEFORMS

CROSS-REFERENCE TO RELATED APPLICATIONS

This application is a continuation application of and claims priority to U.S. application Ser. No. 11/644,062, filed on Dec. 21, 2006, now U.S. Pat. No. 8,340,078, issued Dec. 25, 2012 the entire contents of which are incorporated herein by reference.

TECHNICAL FIELD

The present disclosure relates generally to audio quality in telephone and/or internet protocol (IP) systems and, more specifically, to packet loss concealment (PLC).

BACKGROUND

International Telecommunications Union (ITU) G.711 Appendix I is an algorithm for packet loss concealment (PLC). An objective of PLC is to generate a synthetic speech signal to cover missing data (i.e., erasures) in a received bit stream. Ideally, the synthesized signal can have the same timbre and spectral characteristics as the missing signal, and may not create unnatural artifacts. In the ITU G.711 PLC algorithm, when erasures last longer than 10 ms, more than one pitch segment is introduced to generate the synthetic signal, and an extra overlay-add (OLA) is included just after the 10 ms boundary. This extra OLA may not be necessary, and can require more CPU activity, with a possible degradation in voice quality.

In ITU G.711 PLC implementation, a 3.75 ms buffer delay may be required to generate a pitch OLA segment before the erasures for a smooth transition. The pitch can range from 5 ms to 15 ms, which may be suitable for relatively low density digital signal processor (DSP)-based applications. However, as more voice applications are developed on general-purpose X86-based appliances, this algorithm can introduce higher CPU requirements. Accordingly, products such as Meeting Place Express, Lucas, Manchester, or other voice servers or similar products, may benefit from improvements to the G.711 algorithm.

DESCRIPTION OF EXAMPLE EMBODIMENTS

Overview

In one embodiment, a method can include: (i) establishing an internet protocol (IP) connection; (ii) forming a buffered version of a plurality of voice frame slices from received audio packets; and (iii) when an erasure is detected, performing a packet loss concealment (PLC) to provide a synthesized speech signal for the erasure, where the PLC can include: (a) identifying first and second, and more if needed, pitches from the buffered version of the plurality of voice frame slices; and (b) forming the synthesized speech signal by using the first and second pitches followed by an overlay-add (OLA).

In one embodiment, an apparatus can include: (i) an input configured to receive a packet having audio information, the audio information being arranged in a plurality of voice frame slices; (ii) logic configured to identify first and second pitches from a buffered version of the plurality of voice frame slices; and (iii) logic configured to provide a synthesized speech signal for a missing portion of the audio information, the synthesized speech signal including the first and second, and more if needed, pitches followed by an OLA.

In one embodiment, a system can include an IP phone configured to receive a packet having audio information, the audio information being arranged in a plurality of voice frame slices, the IP phone having an encoder/decoder (codec), where the codec can include: (i) logic configured to identify first and second pitches from a buffered version of the plurality of voice frame slices; and (ii) logic configured to provide a synthesized speech signal for a missing portion of the audio information, the synthesized speech signal comprising the first and second pitches followed by an OLA.

Example Embodiments

Figure 1:
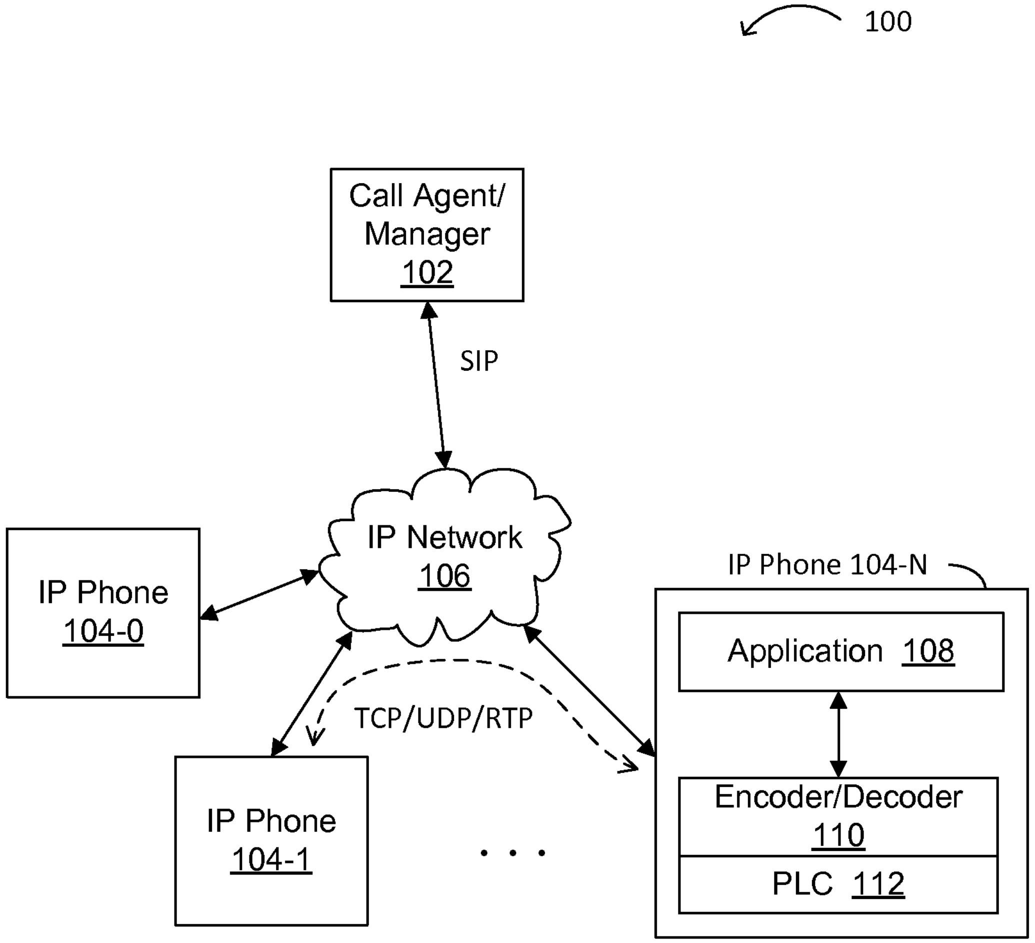
FIG. 1 illustrates an example IP phone system.

Referring now to FIG. 1, an example IP phone system, such as a voice over IP (VoIP) system, is indicated by the general reference character 100. Call agent/manager 102 can interface to IP network 106, as well as to IP phones 104-0, 104-1, . . . IP phone 104-N. Call agent/manager 102 can utilize session initiation protocol (SIP) for establishing IP connections among one or more of IP phones 104-0, 104-1, . . . 104-N. For example, the IP phones can utilize transmission control protocol (TCP), user datagram protocol (UDP), and/or real-time transport protocol (RTP) to communicate with each other. Further, such communication can be in a form of audio packets, audio information, and/or voice frames/slices, for example.

Each of IP phones 104-0, 104-1, . . . 104-N, as illustrated in IP phone 104-N, can include an application 108 coupled to encoder/decoder (codec) 110, as well as packet loss concealment (PLC) block 112. In particular embodiments, when audio information is lost in transport (e.g., from IP phone 104-1 to IP phone 104-N) or otherwise "erased," PLC 112 can be utilized to generate a synthetic speech signal for a missing audio portion, as will be discussed in more detail below. Further, a digital signal processor (DSP), or other processor (e.g., a general-purpose processor, or a specialized processor), can be utilized to implement codec 110 and/or PLC 112. Also, call agent/manager 102 can include a voice server, for example.

Figure 2:
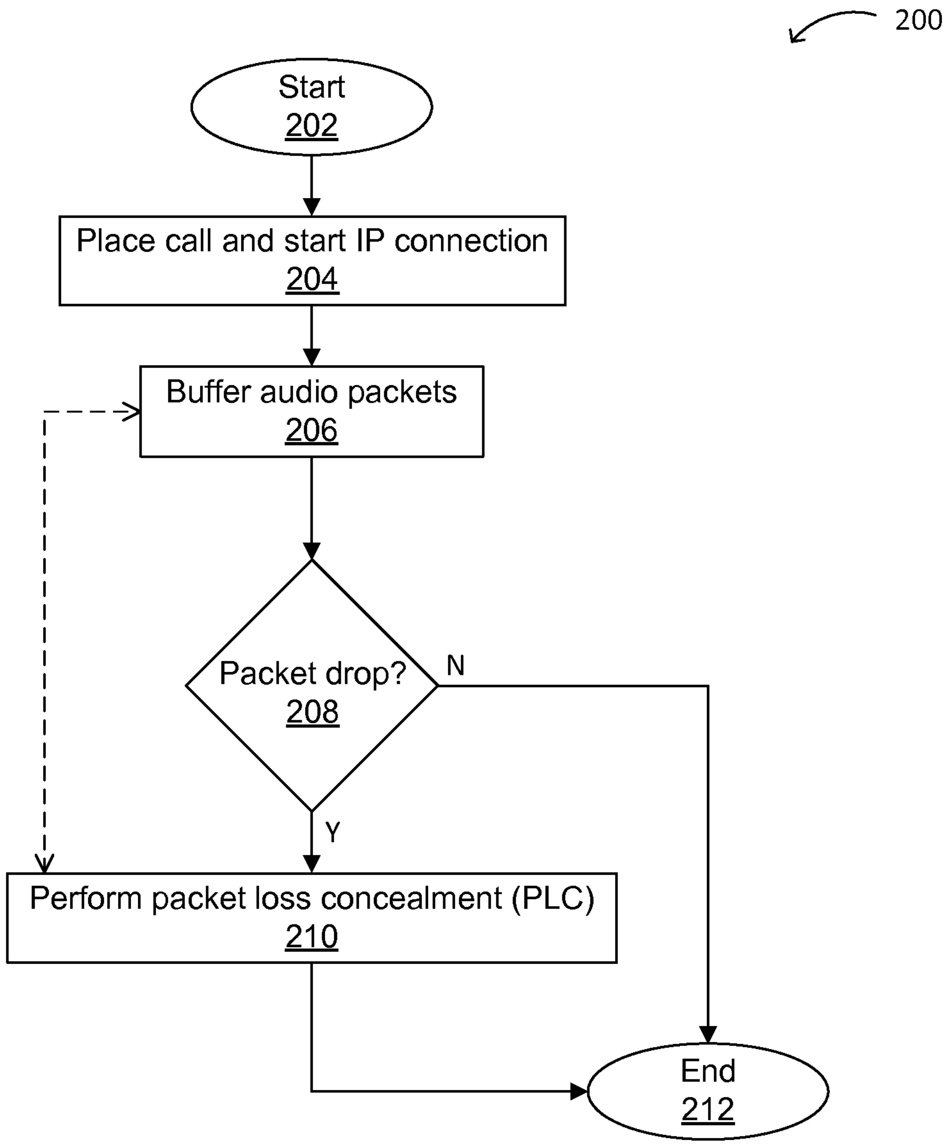
FIG. 2 illustrates an example packet loss concealment (PLC) flow.

Referring now to FIG. 2, an example packet loss concealment (PLC) flow is indicated by the general reference character 200. The flow can begin (202), and an IP connection can be established (e.g., by placing a call using an IP phone) (204). Such a connection can be made through a call agent (e.g., 102 of FIG. 1), or directly between IP phones 104-1 and 104-N in the particular example shown in FIG. 1. In FIG. 2, incoming audio packets can then be buffered (206). For example, in conventional approaches, a delay of 3.75 ms may be added. However, in particular embodiments, a delay of about 5 ms, or about half a voice frame slice, can be utilized in the buffering.

If a packet containing audio information is not dropped (208) or there are no erasures, the flow can complete (212). However, if the packet and/or any such audio information contained therein is dropped (208), or partially or fully erased, PLC can be performed (210), then the flow can complete (212). Also in particular embodiments, buffered audio packets (206) can be utilized in the PLC process. Further, the example flow as illustrated in FIG. 2 can be implemented in an IP phone (e.g., in the firmware of a DSP, or any other suitable hardware).

Figure 3:
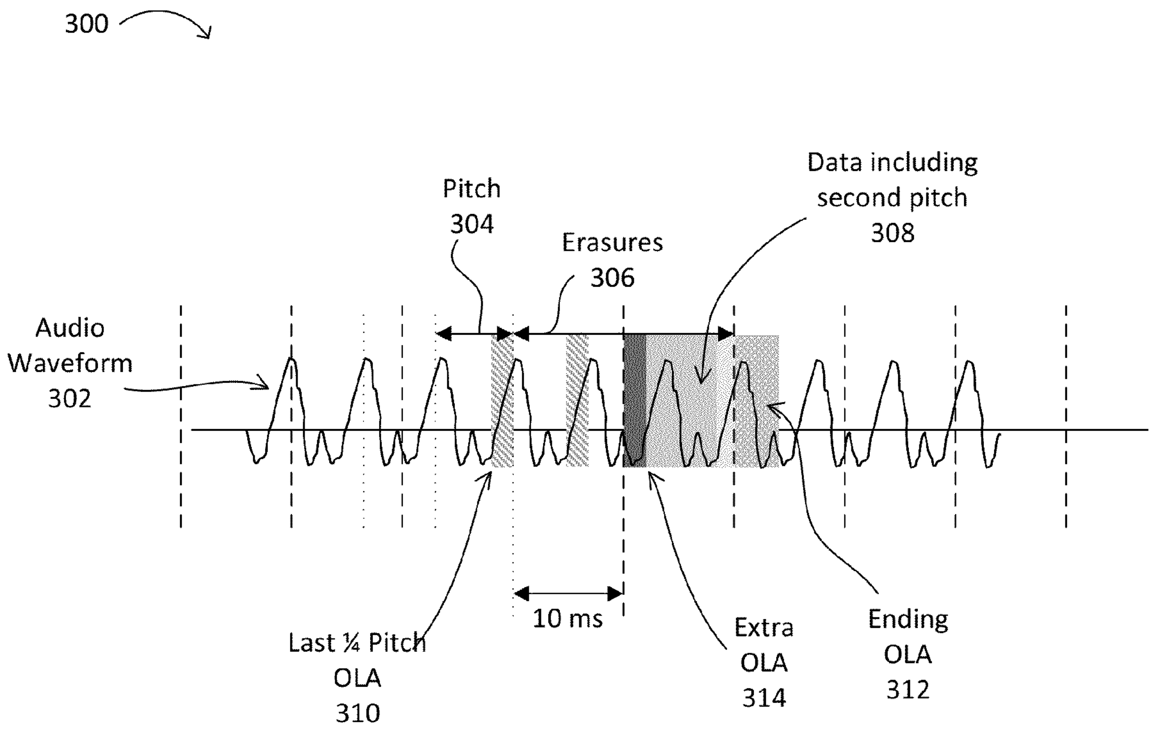
Figure 3 PRIOR ART
FIG. 3 illustrates an example G.711 PLC waveform.

Referring now to FIG. 3, an example G.711 PLC waveform is indicated by the general reference character 300. Audio waveform 302 can include pitch 304, and a synthesized signal portion to replace erasures 306, for example. Data including second pitch 308, as well as extra OLA 314, and ending OLA 312, can also be supplied as part of the synthesized signal portion. Further, last ¼ pitch OLA 310 can be utilized to identify characteristics of an extended ending portion (see, e.g., ITU G.711 Appendix I) for the synthesized signal.

As discussed above, an objective of PLC may be to generate a synthetic speech signal to cover missing data (e.g., erasures 306) in a received bit stream (e.g., audio waveform 302). Further, any such synthesized signal may have timbre and spectral characteristics similar to the missing signal portion, and may not create unnatural artifacts in the synthesized signal. In the approach of ITU G.711 PLC, when the erasures last longer than 10 ms, more than one pitch segment may be introduced to generate the synthetic signal, and an extra OLA (e.g., OLA 314) may also be added after the boundary of 10 ms, as shown. This boundary may be related to the packets and/or voice-frame slices therein. In particular embodiments, this extra OLA may be removed in order to avoid additional CPU usage accompanied by a possible degradation in voice quality.

Figure 4:
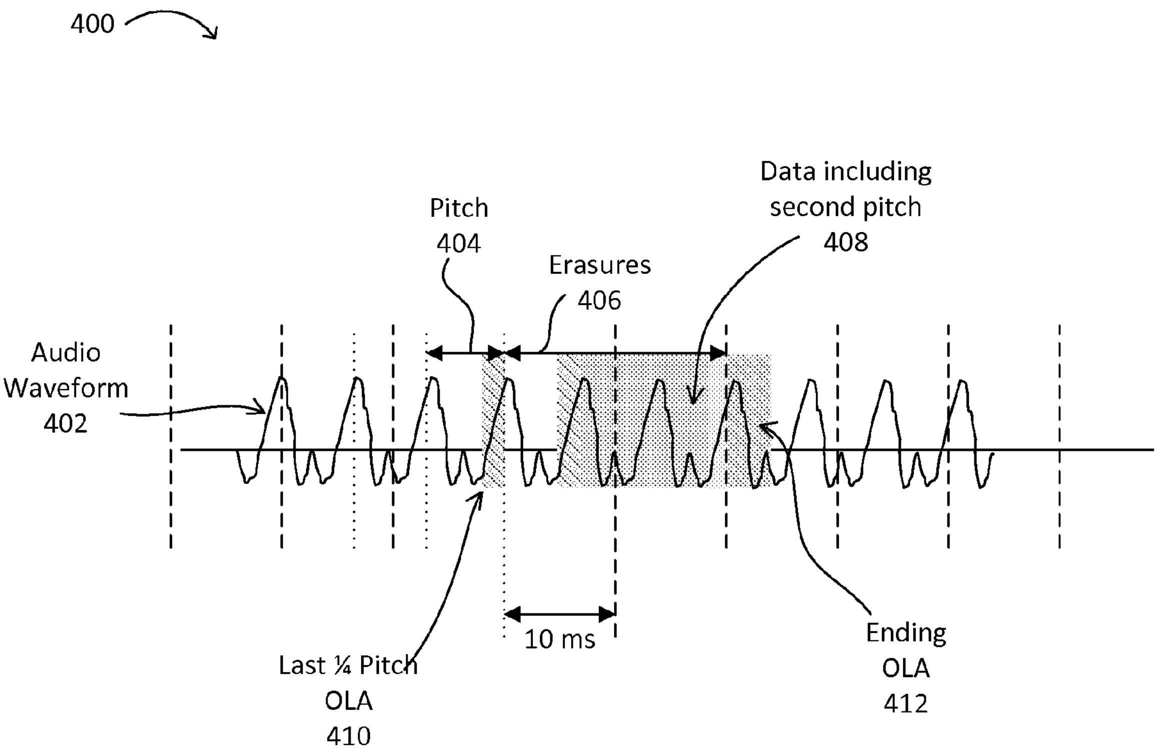
FIG. 4 illustrates an example PLC waveform having a removed extra overlay-add (OLA).

In particular embodiments, two key improvements to the packet loss concealment algorithm discussed above can lead to improvements in efficiency. Referring now to FIG. 4, an example PLC waveform having a removed extra OLA is indicated by the general reference character 400. Audio waveform 402 can include pitch 404, and a synthesized signal portion to replace erasures 406, for example. Data including second pitch 408, and ending OLA 412, can also be supplied as part of the synthesized signal portion. Further, last ¼ pitch OLA 410 can be utilized to identify characteristics of the extended ending portion of the synthesized signal. As discussed above, PLC can be used to generate a synthetic speech signal to cover missing data (e.g., erasures 406) in a received bit stream (e.g., audio waveform 402).

In particular embodiments, a first efficiency improvement can be derived from removing the extra OLA (e.g., OLA 314 of FIG. 3). Further, a value of 10 ms to add a second pitch to construct the synthetic speech signal may also not be critical to effective PLC, and other local values may yield similar performance. In particular embodiments, instead of using the second pitch data after 10 ms, the second pitch may be included or appended after the first pitch. Accordingly, the range may be from about 5 ms to about 15 ms. FIG. 4 shows a case with a pitch of about 8 ms.

In this fashion, there may be no extra OLA utilized in particular embodiments. Thus, only a single OLA may be used after the first and second pitches for forming the synthesized signal. Further, voice quality may be improved by eliminating this extra OLA. In particular embodiments, an additional performance improvement can be derived from changing the use of a 3.75 ms buffer delay in conventional approaches. Voice frames (e.g., as used in voice over internet protocol, or VoIP, applications) may typically be based on 10 ms increments. Thus, using a 3.75 ms delay for voice processing can add an irregular memory offset for key voice processing, and this can cause additional processing inefficiencies.

A delay of 3.75 ms is used in the G.711 PLC algorithm, however a key performance improvement can be made by observing that a slightly longer delay can yield the same or similar results from an algorithm in particular embodiments. Accordingly, by slightly increasing the delay for buffering, introduced efficiencies can be realized in voice processing of audio frames. Thus, by increasing the delay to about half a voice frame slice (e.g., 5 ms), a performance of voice processing operations can be improved at a cost of an additional 1.25 ms, for example. Also, a pre-initialized 5 ms buffer can be used such that processing can begin as soon as a first frame or packet may be received.

In particular embodiments, a combination of these two enhancements can allow for a scaling of an audio processing subsystem, as well as facilitate adaptability to other systems. Further, a combination of these two enhancements can increase an audio mixer density of voice conference bridges, or reduce a CPU computation cost of IP phones. In addition, packet loss concealment can be implemented in DSPs-based or X86-based audio mixers to allow for higher voice quality than previous implementations of voice conferencing systems.

In particular embodiments, an OLA operation may be removed from an original ITU PLC algorithm by introducing a second pitch. Such a second pitch may reduce a CPU load and yield better performance in a resulting voice signal. An additional scheme in particular embodiments may also have an efficient implementation associated with a buffer delay for packet loss concealment.

Although the description has been described with respect to particular embodiments thereof, these particular embodiments are merely illustrative, and not restrictive. For example, other types of waveforms and/or OLAs could be used in particular embodiments. Furthermore, particular embodiments are suitable to applications other than VoIP, and may be amenable to other communication technologies and/or voice server applications.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:

receiving, at a network device, Internet Protocol (IP) packets that include audio information;

storing, by the network device, the IP packets in a buffer;

examining, by the network device, an audio waveform based on the audio information included in the IP packets in the buffer;

determining, by the network device, presence of an erasure in a portion of the audio waveform;

responsive to determining the presence of the erasure:

identifying an extant pitch included in the audio waveform preceding the erasure, and determining a first overlay add (OLA) on a last quarter pitch wavelength of the audio waveform preceding the erasure; and generating, by the network device and in the portion of the audio waveform corresponding to the erasure, a synthesized signal including:

a first pitch and a second pitch that are based on the identified pitch and directly connected to one another, the first and the second pitches positioned following the first OLA, and a second OLA on a first quarter pitch wavelength of the audio waveform succeeding the erasure, the second OLA positioned following the first and the second pitches, wherein characteristics of an extended ending portion of the synthesized signal are based on the first OLA.

2. The method of claim 1, wherein a duration of the erasure is in a range from about 5 milliseconds to about 15 milliseconds.

3. The method of claim 1, wherein generating the synthesized signal including the first and the second pitches directly connected to one another comprises:

generating the synthesized signal including the first and the second pitches without an OLA in between the first and the second pitches.

4. The method of claim 1, wherein storing the IP packets in a buffer comprises:

adding a delay of about half a voice frame slice to received IP packets for storing in the buffer.

5. The method of claim 4, wherein the buffer is pre-initialized with a size corresponding to a 5 milliseconds delay.

6. The method of claim 1, wherein the audio waveform includes a voice waveform and wherein the synthesized signal includes a speech signal.

7. The method of claim 1, wherein the network device includes an IP phone and wherein receiving the IP packets comprises:

establishing an IP connection with a remote network device by placing a call using the IP phone.

8. A system comprising:

a processor;

instructions embedded in a non-transitory machine-readable medium for execution by the processor and, when executed, configured to cause the processor to perform operations comprising:

receiving, at a network device, Internet Protocol (IP) packets that include audio information;

storing, by the network device, the IP packets in a buffer;

examining, by the network device, an audio waveform based on the audio information included in the IP packets in the buffer;

determining, by the network device, presence of an erasure in a portion of the audio waveform;

responsive to determining the presence of the erasure:

identifying an extant pitch included in the audio waveform preceding the erasure, and determining a first overlay add (OLA) on a last quarter pitch wavelength of the audio waveform preceding the erasure; and generating, by the network device and in the portion of the audio waveform corresponding to the erasure, a synthesized signal including:

a first pitch and a second pitch that are based on the identified pitch and directly connected to one another, the first and the second pitches positioned following the first OLA, and a second OLA on a first quarter pitch wavelength of the audio waveform succeeding the erasure, the second OLA positioned following the first and the second pitches, wherein characteristics of an extended ending portion of the synthesized signal are based on the first OLA.

9. The system of claim 8, wherein a duration of the erasure is in a range from about 5 milliseconds to about 15 milliseconds.

10. The system of claim 8, wherein the instructions that are configured to cause the processor to perform operations comprising generating the synthesized signal including the first and the second pitches directly connected to one another includes instructions that are configured to cause the processor to perform operations comprising:

generating the synthesized signal including the first and the second pitches without an OLA in between the first and the second pitches.

11. The system of claim 8, wherein the instructions that are configured to cause the processor to perform operations comprising storing the IP packets in a buffer includes instructions that are configured to cause the processor to perform operations comprising:

adding a delay of about half a voice frame slice to received IP packets for storing in the buffer.

12. The system of claim 11, wherein the buffer is pre-initialized with a size corresponding to a 5 milliseconds delay.

13. The system of claim 8, wherein the audio waveform includes a voice waveform and wherein the synthesized signal includes a speech signal.

14. The system of claim 8, wherein the network device includes an IP phone and wherein the instructions that are configured to cause the processor to perform operations comprising receiving the IP packets includes instructions that are configured to cause the processor to perform operations comprising:

establishing an IP connection with a remote network device by placing a call using the IP phone.

15. A computer program product, implemented in a non-transitory machine-readable medium including instructions for execution by a processor, the instructions, when executed, configured to cause the processor to perform operations comprising:

receiving, at a network device, Internet Protocol (IP) packets that include audio information;

storing, by the network device, the IP packets in a buffer;

examining, by the network device, an audio waveform based on the audio information included in the IP packets in the buffer;

determining, by the network device, presence of an erasure in a portion of the audio waveform;

responsive to determining the presence of the erasure:

identifying an extant pitch included in the audio waveform preceding the erasure, and determining a first overlay add (OLA) on a last quarter pitch wavelength of the audio waveform preceding the erasure; and generating, by the network device and in the portion of the audio waveform corresponding to the erasure, a synthesized signal including:

a first pitch and a second pitch that are based on the identified pitch and directly connected to one another, the first and the second pitches positioned following the first OLA, and a second OLA on a first quarter pitch wavelength of the audio waveform succeeding the erasure, the second OLA positioned following the first and the second pitches, wherein characteristics of an extended ending portion of the synthesized signal are based on the first OLA.

16. The computer program product of claim 15, wherein a duration of the erasure is in a range from about 5 milliseconds to about 15 milliseconds.

17. The computer program product of claim 15, wherein the instructions that are configured to cause the processor to perform operations comprising generating the synthesized signal including the first and the second pitches directly connected to one another includes instructions that are configured to cause the processor to perform operations comprising:

generating the synthesized signal including the first and the second pitches without an OLA in between the first and the second pitches.

18. The computer program product of claim 15, wherein the instructions that are configured to cause the processor to perform operations comprising storing the IP packets in a buffer includes instructions that are configured to cause the processor to perform operations comprising:

adding a delay of about half a voice frame slice to received IP packets for storing in the buffer.

19. The computer program product of claim 18, wherein the buffer is pre-initialized with a size corresponding to a 5 milliseconds delay.

20. The computer program product of claim 15, wherein the audio waveform includes a voice waveform and wherein the synthesized signal includes a speech signal.

21. The computer program product of claim 15, wherein the network device includes an IP phone and wherein the instructions that are configured to cause the processor to perform operations comprising receiving the IP packets includes instructions that are configured to cause the processor to perform operations comprising:

establishing an IP connection with a remote network device by placing a call using the IP phone.

* * * * *